United States Patent

Buch et al.

[11] Patent Number: 5,800,072
[45] Date of Patent: Sep. 1, 1998

[54] BEARING ASSEMBLY

[75] Inventors: Stefan Buch, Schweinfurt; Paul-Gerhard Hoch, Dittelbrunn; Wolfgang Klopf, Schweinfurt, all of Germany

[73] Assignee: SKF GmbH, Germany

[21] Appl. No.: 826,399

[22] Filed: Mar. 24, 1997

[30] Foreign Application Priority Data

Mar. 29, 1996 [DE] Germany ............ 196 12 589.8

[51] Int. Cl.$^6$ .................................................. F16C 33/36
[52] U.S. Cl. ...................................................... 384/568
[58] Field of Search ........................ 384/568, 558, 384/565, 450

[56] References Cited

U.S. PATENT DOCUMENTS 4,705,411  11/1987  Kellstrom ................ 384/568 X

FOREIGN PATENT DOCUMENTS

| 175858 | 4/1986 | European Pat. Off. ........ 384/568 |
| 76 21 098 | 9/1977 | Germany . |
| 36 22 671 C1 | 5/1986 | Germany . |
| 2112085 | 7/1983 | United Kingdom ............ 384/568 |

*Primary Examiner*—Thomas R. Hannon
*Attorney, Agent, or Firm*—Eugene E. Renz, Jr., P.C.

[57] ABSTRACT

A bearing arrangement, designed in an X-configuration for a planet gear is provided with two angular roller bearings mounted a certain distance apart. Barrel-shaped needles have a large radius of curvature and their length is considerably greater than their diameter. Raceways of the two angular roller bearings have a circular curvature, center of which is located in the radial direction, outside the raceway diameter and in the axial direction, between inner lateral surface and axial center of angular roller bearing in question. As a result, the bearing arrangement is able to pivot slightly even though its dimensions are very small and can also absorb axial loads.

5 Claims, 2 Drawing Sheets

5,800,072

1

BEARING ASSEMBLY

FIELD OF THE INVENTION

The present invention relates to bearing assemblies and more specifically to bearings for planet gears of a gear train.

BACKGROUND OF THE INVENTION

Typical bearing supports for planet gears of a gear train include a two-row self-aligning roller bearing of the type shown and described in German patent DE 76-21,098 U. This bearing assembly is seated in the axial center of the planet gear and has one-piece inner and outer rings. The bearing is capable of absorbing radial and axial loads and allows a small degree of pivoting action of the planet gear with respect to the axis of the pinion cage. The small pivoting action is needed in order for the tooth flanks to adjust to one another. It has been found that axial loads which occur are less pronounced when the sets of teeth can assume a skewed position with respect to one another and, thus, cause the planet gear to drift in the axial direction. It has been found that this known design fulfills the requirements for many practical applications. However, the design does have limitations, particularly in small compact gear trains.

In compact gear trains, which demand high precision in a unit of relatively small dimensions, it has been found that the two-row self-aligning roller bearing of the standard design described above presents a natural limitation and is not suitable in these applications. Specifically, the radial dimensions do not allow planet gears of small diameter or with only a small number of teeth to be utilized.

It has been proposed in small compact gear trains to use needle bearings as shown in German patent DE 3,622,671. However, in these applications, the axial forces must be absorbed by additional axial bearings and, consequently, the amount of space required to house the entire bearing unit must be larger, at least in the axial direction, which adds, not only to bulk, but also to cost.

SUMMARY OF THE INVENTION

With the foregoing in mind therefore, it is an object of the present invention to provide a bearing arrangement particularly adapted for compact gear train applications which is characterized by novel features of construction and arrangement so that it requires only small dimensions in the radial and axial direction which facilitates the use of planet gears of small diameter and one which has the ability to pivot sufficiently and has a high load bearing capacity. To this end, a bearing assembly in accordance with the present invention utilizes rollers which are essentially barrel-shaped needles having a length at least twice the largest diameter. Preferably, the axial curvature of the outer raceway of the outer ring is circular and is of a curvature having a center located in an area extending from the axial center between the two angular roller bearing assemblies to the axial center of one of angular roller bearing assemblies. Further, the width or length of the raceway of the bearing rings is at least the same of as the length of the needles. The clearances are preferably selected to provide a small amount of radial play.

A bearing made in accordance with the present invention is of compact design and is capable of withstanding combined axial and radial loads. For example, it has been found that a bearing of the present invention has nearly the same small radial dimensions as a bearing with cylindrical needles and provides the additional functional advantages of an axial bearing to withstand axial load and a pivoting function or capacity sufficient to provide the desired and necessary tooth flank adjustment in planetary gear systems. Further, by reason of a relatively large radii of curvature, the needles may be made very thin and of an extremely small diameter. The bearing arrangement of the present invention allows for both bearings to shift outwardly as far as the lateral surfaces of the planet gear where they provide the best radial support. However, a small but sufficient pivoting motion is made possible by the radial play. Accordingly, the bearing arrangement of the present invention satisfies the desired requirements of radial and axial load-bearing capacity in the smallest possible space since it has the capacity to pivot, it permits the tooth flanks of the planet gears to adjust to each other and thereby ensure a uniform distribution of the load.

BRIEF DESCRIPTION OF THE DRAWINGS

With the foregoing in mind, these and other objects of the present invention and the various features and details of the operation and construction thereof, are hereinafter more fully set forth with reference to the accompanying drawings, wherein.

DETAILED DESCRIPTION OF THE PREFERRED EMBODIMENT

Figure 1:
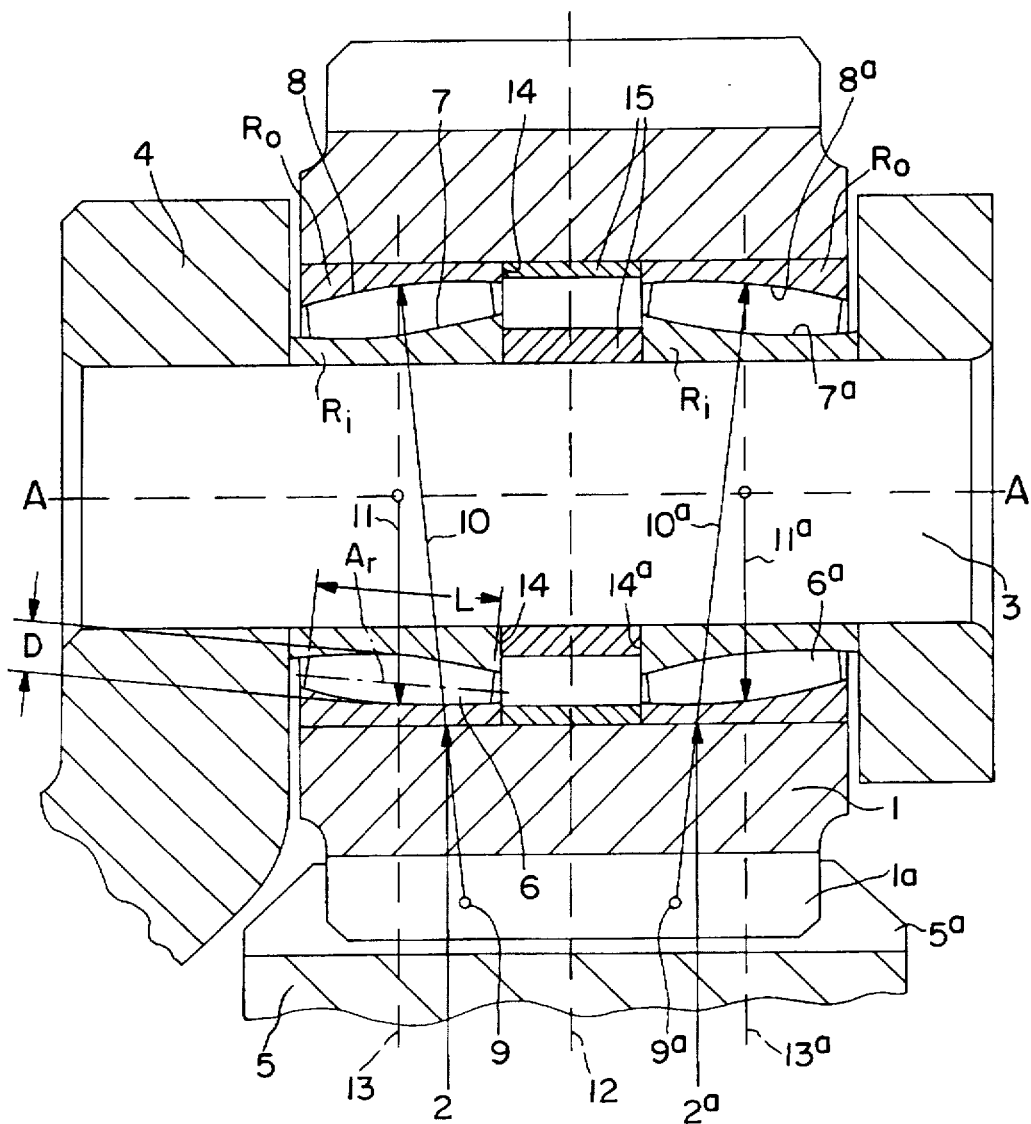
FIG. 1 is a transverse, sectional view showing a planetary gear train system and two angular roller bearing assemblies of X-configuration in accordance with the present invention.

Referring now to the drawings and, more particularly to FIG. 1 thereof, there is shown a planetary gear system incorporating bearing assemblies in accordance with the present invention. The planetary gear system comprises a planet gear (1) rotatably supported on a shaft (3) by a pair of angular roller bearing assemblies (2) of an X-configuration in accordance with the present invention. The shaft (3) is mounted in a pinion cage of conventional design. As usual in these planet gear systems, several planet gears (1) are distributed around the circumference of a sun gear (5). The planet gear (1), as is customary, has teeth (1a) which mesh and engage with teeth (5a) of the sun gear (5).

The angular roller bearing assembly (2) of the present invention as illustrated in the drawings has barrel-shaped needles (6) which have an axial length (L) at least four times the greatest diameter (D) and are oriented so that the axis of rotation (Ar) of the rollers is angularly disposed relative to the axis (A—A) of the shaft (3). In accordance with this embodiment, the barrel-shaped profile is circular in form and the rollers are symmetrical about their axis of rotation (Ar).

The inner raceways (7, 7a) of inner rings (Ri) and outer raceways (8, 8a) of the outer rings (Ro) of the two bearing assemblies have curvatures conforming to the profile of the rollers. The centers (9, 9a) of radii curvature (10, 10a) of the two outer rings (Ro) are located in the radial direction outside the angular bearing and in the axial direction at a point between the outer axial end face (14, 14a), and the axial midplane (13–13a).

It is noted that the circular axial curvature of the outer raceways (8, 8a) is the curved shape of the raceway as viewed in an axial direction and is generally the same as the shape of the roller and is not the radius of the raceway as taken in the rolling direction.

The circular axial curvature of the outer ring (Ro) has a circumferential radius 10 with its midpoint center (9, 9a) externally of the bearing and the radius (11, 11a) of the raceway (8, 8a) has its center on the midline (A—A) of the bearing. Specifically, the axial curved shape of the outer raceway (8, 8a) is rotated through 360 degrees on the radius (11, 11a) whose origin is on the axial center line A—A of the bearing.

Figure 2:
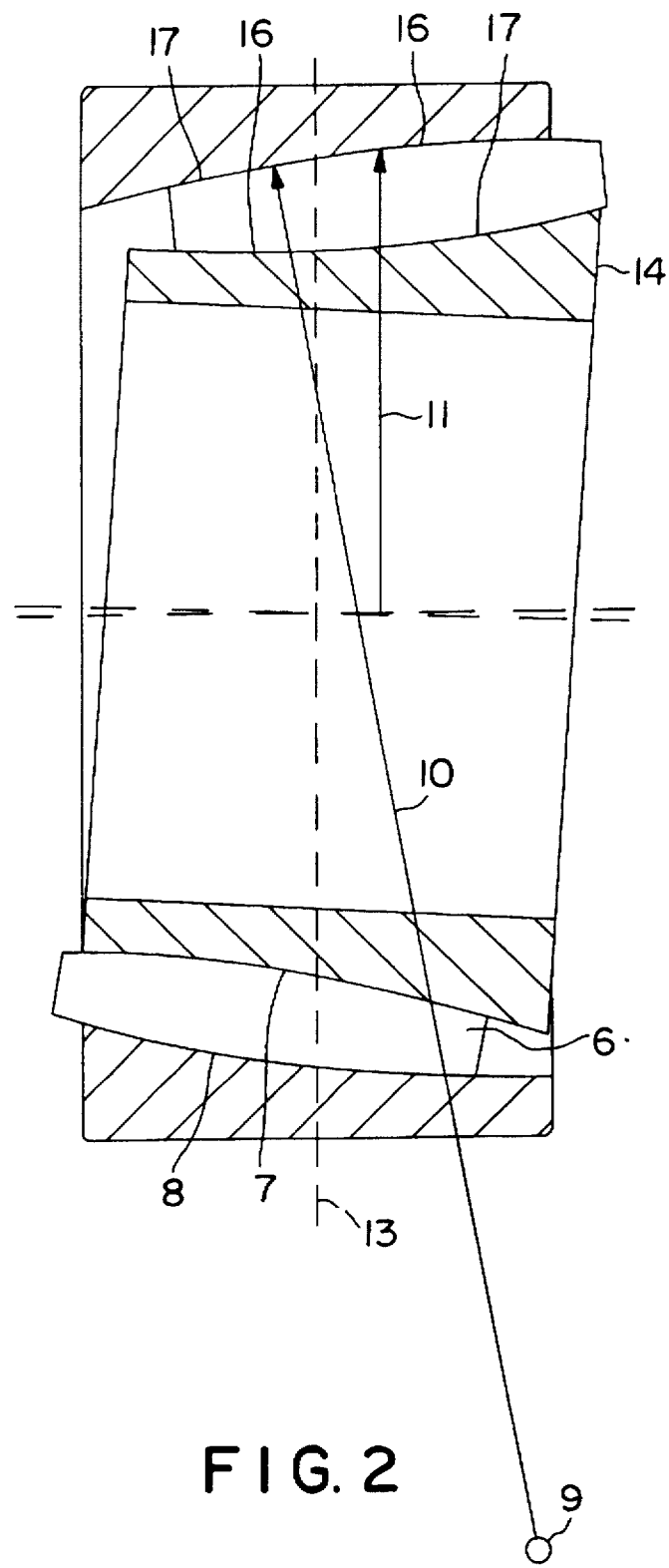
FIG. 2 is an enlarged, longitudinal cross section of one of the angular roller bearing assemblies in FIG. 1 with the parts illustrated in a pivoted position.

FIG. 2 shows generally the pivoted situation of one of the bearings of FIG. 1. According to FIG. 1, the center (9) of the radius of curvature (10) of the outer ring is located in the radial direction, outside angular roller bearing and, in the axial direction, in the middle between inner lateral surface (14) and midplane (13) of the angular roller bearing. In contrast to a conventional self-aligning roller bearing, in this design, the center (9) do not lie together on the center axis, but on a circle surrounding the bearing. For this reason, the bearing arrangement has only a limited ability to pivot, the maximum pivot angle of which is a function of the radial play, not shown in detail. As FIG. 2 shows, a small pivoting motion causes barrel-shaped needles (6) to shift in the circumferential direction in completely different ways. They shift axially in the direction opposite that in which the outer ring section in question is pivoting and in the same direction as that in which the inner ring section in question is pivoting. Any further pivoting out of the position shown in FIG. 2 is no longer possible, because the intentionally provided radial play of the normal position has been reduced to zero (0).

The pivoting feature of the present invention has particular application and usefulness in planet gear systems. Because, in these systems, production tolerances cannot be avoided. However, the contact pattern of the inter-engaging teeth of the planet and sun gears can automatically adjust itself by the pivoting action to achieve the maximum possible contact width or bearing surface.

Even though a particular embodiment of the invention has been illustrated and described herein, it is not intended to limit the invention and changes and modifications may be made therein within the scope of the following claims.

What is claimed is:

1. A bearing system for supporting planet gears of a gear train on a shaft member, comprising:

a) at least two slightly pivoting angular roller bearing assemblies for absorbing radial and axial forces;
 b) each bearing assembly comprising inner and outer rings (Ri, Ro) having confronting spaced raceways (7a, 8a) and a plurality of barrel-shaped needle rollers (6a) in the annular space between the raceways (7a, 8a);
 c) the needle rollers of one bearing assembly being oppositely inclined to the needle rollers of the other bearing assembly relative to the axis of the shaft;
 d) the needle rollers (6a) having a length (L) at least twice as long as their largest diameter (D);
 e) the raceways (7a, 8a) of the outer rings (Ro) having a circular axial curvature with a curvature having a radius (10) greater than the radius (11) of the raceway (Ro), the center of curvature (9) of the outer raceway (Ro) of one bearing assembly being located in an area extending from the axial center (12) between the two roller bearings and the axial center (13) of said one roller bearing;
 f) the width (W) of the raceway of the individual bearing rings being at least the same as the length of the needles; and
 g) the two angular roller bearings have a small amount of radial play.

2. A bearing system according to claim 1, characterized in that the center (9) is located between an inner lateral surface (14) of said one roller bearing and an axial center (13) of the bearings.

3. A bearing system according to claim 1, characterized in that the center (9) is located midway between an inner lateral surface (14) and an axial center (13) of said one roller bearing.

4. A bearing system according to claim 1, characterized in that the radius of curvature(10) of the outer raceway (Ro) is greater than twice the radius (11) of the raceway (Ro).

5. A bearing system according to claim 1, characterized in that the angular roller bearing are installed with a certain axial distance between them.

* * * * *